(12) United States Patent
Furman, Jr. et al.

(10) Patent No.: US 8,071,667 B2
(45) Date of Patent: Dec. 6, 2011

(54) COMPOSITIONS COMPRISING (POLY) ALPHA OLEFINS

(75) Inventors: Gary S. Furman, Jr., St. Charles, IL (US); Vladimir A. Grigoriev, Chicago, IL (US)

(73) Assignee: Nalco Company, Naperville, IL (US)

( * ) Notice: Subject to any disclaimer, the term of this patent is extended or adjusted under 35 U.S.C. 154(b) by 1132 days.

(21) Appl. No.: 11/143,418

(22) Filed: Jun. 2, 2005

(65) Prior Publication Data

US 2006/0272787 A1 Dec. 7, 2006

(51) Int. Cl.
  *C08K 5/544* (2006.01)
  *C08K 5/17* (2006.01)
  *C08K 5/19* (2006.01)
  *D21H 25/02* (2006.01)
  *D21H 23/00* (2006.01)

(52) U.S. Cl. ........ 524/188; 524/186; 524/262; 524/261; 162/158; 162/173

(58) Field of Classification Search ............ 524/322, 524/379, 86, 579, 188, 186, 262, 261; 106/285, 106/287.11; 526/134, 160, 348
See application file for complete search history.

(56) References Cited

U.S. PATENT DOCUMENTS

| | | | |
|---|---|---|---|
| 4,145,436 A * | 3/1979 | Michaels | 514/401 |
| 4,603,158 A * | 7/1986 | Markham et al. | 524/100 |
| 5,125,995 A * | 6/1992 | D'Haese et al. | 156/155 |
| 5,177,276 A * | 1/1993 | Beach et al. | 585/7 |
| 5,417,869 A * | 5/1995 | Giacobbe et al. | 508/189 |
| 5,853,708 A * | 12/1998 | Cauwet et al. | 424/70.22 |
| 6,454,901 B1 | 9/2002 | Sekiya et al. | |
| 6,562,194 B1 | 5/2003 | Archer et al. | |
| 6,627,184 B2 * | 9/2003 | Coffindaffer et al. | 424/70.11 |
| 7,619,026 B2 * | 11/2009 | Yang et al. | 524/491 |
| 7,740,873 B2 * | 6/2010 | Decoster et al. | 424/401 |
| 2002/0173569 A1 * | 11/2002 | Karhu et al. | 524/313 |
| 2003/0100662 A1 | 5/2003 | Wang et al. | |
| 2004/0042980 A1 * | 3/2004 | Kanji et al. | 424/59 |
| 2006/0018966 A1 * | 1/2006 | Lin et al. | 424/484 |

FOREIGN PATENT DOCUMENTS

| | | | |
|---|---|---|---|
| FR | 2 846 555 A1 * | 5/2004 | |
| JP | 59088992 | 5/1984 | |
| JP | 2004-293015 | * 10/2004 | |
| WO | WO 01/88031 A1 | 11/2001 | |

OTHER PUBLICATIONS

NesteOil Nexbase 2000 series, technical data sheets (Oct. 24, 2005).*
JP 2004-293015 (Oct. 2004) abstract and translation in English.*
http://www.exxonmobilchemical.com/Public_Files/Synthetics/Synthetic_Lubricants_and_Fluids/Worldwide/Technical_Paper_PureSyn_PAOs_Versatile_Emollients.pdf ., Oct. 2008.*

* cited by examiner

*Primary Examiner* — Rip A. Lee
(74) *Attorney, Agent, or Firm* — Benjamin E. Carlsen; Michael B. Martin

(57) ABSTRACT

A release aid comprising one or more (poly)$C_5$-$C_{20}$ alpha olefins and one or more surfactants for use in releasing a paper web from the fabric in through air drying processes and/or from the Yankee dryer, compositions comprising the release aid and methods of using the release aid.

13 Claims, No Drawings

COMPOSITIONS COMPRISING (POLY) ALPHA OLEFINS

TECHNICAL FIELD

This invention concerns release formulations for papermaking applications. More particularly, this invention is directed to formulations comprising synthetic (poly) alpha olefins and methods of using the compositions as release aids in tissue making applications.

BACKGROUND OF THE INVENTION

In the manufacture of certain wet-laid paper products, such as facial tissue, bathroom tissue, or paper towels, the web is conventionally subjected to a creping process in order to give the web desirable textural characteristics, such as softness, bulk, stretch, and absorbency.

In one form of tissuemaking, the wet sheet is dried by means of through-air dryers, whereby hot air is passed through the sheet to dry it. This process preserves the bulk of the sheet and provides improved softness, a much-desired property. The wet sheet is carried to the through dryer by means of a fabric (referred to as a TAD fabric). The TAD fabric has a 3-dimensional character and serves to mold or pattern the wet sheet so that when dry, this pattern remains in the tissue. In order for effective patterning of the sheet to occur, the wet sheet has to be pulled into the fabric by a vacuum molding box. However after the sheet is dry, it must be transferred from the TAD fabric for additional processing.

In the CTAD process the sheet is transferred to a Yankee dryer and creped prior to final winding on the reel as described below. In the UCTAD process the sheet is separated from the fabric and goes directly to the reel. In both processes, the sheet that has previously been intimately molded into the 3-dimensional TAD fabric must be separated from the fabric without damaging the sheet.

TAD fabric release formulations are used to aid in the separation of the sheet from the TAD fabric. They are applied to the fabric, for example by spraying, prior to transfer of the sheet from the forming fabric to the TAD fabric. In addition by providing good transfer, they help to prevent individual fibers from pulling out of the sheet and remaining with the fabric. This keeps the fabric clean and allows optimum drying and molding of the sheet.

Typical creping processes involve the adherence of the sheet to a rotating creping cylinder, such as an apparatus known as a Yankee dryer, and then dislodging the adhered sheet from the cylinder with a doctor blade. The impact of the doctor blade against the web ruptures some of the fiber-to-fiber bonds within the web thereby causing the sheet to wrinkle or pucker.

In order to increase adhesion, a creping adhesive aid may be used to enhance any naturally occurring adhesion that the web may have due to its water content, which will vary widely depending on the extent to which the web has been previously dried. Creping adhesives should also prevent wear of the dryer surface and provide lubrication between the doctor blade and the dryer surface and reduce chemical corrosion, as well as control the extent of creping. A coating that adheres the sheet just tightly enough to the drum will give a good crepe, imparting absorbency and softness with the desired loss of paper strength. If adhesion to the dryer drum is too strong, the sheet may pick or even "plug", i.e. slip under the doctor blade, and wrap around the dryer drum. If there is not enough adhesion, the sheet will lift off too easily and undergo too little creping. The creping adhesive, generally in an aqueous solution or dispersion form, is usually sprayed onto the surface of the creping cylinder, e.g. the Yankee dryer.

In order to assist in the uniform release of the sheet at the creping blade, a release aid is sprayed onto the cylinder. These aids assist in the uniform release of the tissue sheet at the creping blade, and also lubricate and protect the blade from excessive wear.

Accordingly, there is an ongoing need in the industry for improved formulations to aid in release of the paper sheet from the TAD fabric and from the creping cylinder.

SUMMARY OF THE INVENTION

In an aspect, this invention is a composition comprising one or more (poly)$C_5$-$C_{20}$ alpha olefins and one or more surfactants.

In another aspect, this invention is a method of imparting textural characteristics to a paper web comprising
  a) applying a composition comprising one or more (poly) $C_5$-$C_{20}$ alpha olefins and one or more surfactants to a fabric having a 3-dimensional pattern;
  b) providing for intimate contact of the paper web to the fabric to effect molding of the paper web into a three-dimensional structure; and
  c) dislodging the paper web from the fabric.

In another aspect, this invention is a method of creping a paper web comprising
  a) applying a composition comprising one or more (poly) $C_5$-$C_{20}$ alpha olefins and one or more surfactants to a rotating creping cylinder;
  b) pressing the paper web against the creping cylinder to effect adhesion of the paper web to the creping cylinder; and
  c) dislodging the paper web from the creping cylinder with a doctor blade.

Use of synthetic oils, particularly (poly) alpha olefins or PAO in release formulations increases their effectiveness and efficiency for papermaking applications. Particularly beneficial has been the use of (poly) alpha olefins in formulations to provide release of tissue sheets from through-air drying (TAD) fabrics.

DETAILED DESCRIPTION OF THE INVENTION

"Tissue paper web, paper web, web, paper sheet, sheet and paper product" all refer to sheets of paper made by a process comprising the steps of forming an aqueous papermaking furnish; depositing this furnish onto a foraminous surface, such as a Fourdrinier wire, and removing the water from the furnish either by gravity or by vacuum assisted drainage. In the final step of the process, the desirable textural characteristics are imparted to the paper by means of the TAD fabric or creping, or a combination thereof, and the sheet is dried. An example of a paper machine and a papermaking process that may be used in conjunction with the teachings of the invention is disclosed in U.S. Pat. No. 5,944,954, the general principles of which are incorporated herein by reference. However, it is to be understood that the release aid of the invention can be used in other known papermaking processes and in other known paper machines for manufacturing tissue and/or towel paper products.

The tissue web can be comprised of various types of natural and synthetic fibers including wood pulps of chemical and mechanical types, vegetable fibers, recycled fibers and synthetic fibers such as polypropylene. The tissue web can also be comprised of particulate fillers, such as kaolin clay, titanium dioxide, and/or calcium carbonate.

All percentages, ratios and proportions herein are by weight unless otherwise specified.

The poly alpha olefins ("PAO") of this invention are manufactured by oligimerization of one or more $C_5$-$C_{20}$ alpha olefins with catalysts such as $AlCl_3$, $BF_3$ and alkyl aluminum catalysts to form mixtures of dimers, trimers, tetramers and higher oligomers which are then hydrogenated to form the synthetic oil. "Alpha" means the C=C, double bond is at $C_1$-$C_2$ position in the carbon chain. Suitable poly alpha olefins have a molecular weight of about 250 to about 2,000 and a kinematic viscosity of about 30 to about 70 cSt. (centi Stokes) at 40° C. as measured by ASTM standard test method D 445. Poly alpha olefins are commercially available from a variety of sources including Exxon Mobil, Irving, Tex., under the tradename SpectraSyn, BP, Chicago, Ill., under the trade name Durasyn and Cognis, Cincinnati, Ohio, under the tradename Emery.

In an embodiment, the poly alpha olefin is prepared from one or more $C_6$-$C_{12}$ alpha olefins.

In an embodiment, the poly alpha olefins have a viscosity of about 5 to about 400 cSt. at 40° C.

In an embodiment, the poly alpha olefins have a viscosity of about 30 to about 70 cSt. at 40° C.

In an embodiment, the poly alpha olefins are prepared from decene, dodecene or mixtures thereof.

The composition of this invention includes one or more surfactants to emulsify the poly alpha olefins in water and form a stable dispersion. As used herein "composition", "release aid" and "release aid composition" all refer to the poly alpha olefin-surfactant mixture and compositions comprising the poly alpha olefin-surfactant mixture.

The surfactants may be cationic, anionic, nonionic, amphoteric or zwitterionic so long as they are at least partially oil-soluble. Representative suitable surfactants include but are not limited to fatty acids such as palmitic, stearic, linoleic, oleic and tall oil fatty acids such as those available from Proctor & Gamble Chemicals, Cincinnati, Ohio under the tradenames OL-600 and OL-800 and from Westvaco Chemical Division, Charleston Heights, S.C. under the tradename L-1A; alkoxylated alcohols such as those available from Huntsman LLC, Houston, Tex. under the tradenames Surfonic TDA-9 and Surfonic L24-7 and from Sasol North America, Inc., Houston, Tex. under the tradenames Alfonic 1412-3 and Alfonic TDA-8; alkoxylated fatty acids such as those available from Uniqema, New Castle, Del. under the tradename Tween-20, from Rhodia, Cranbury, N.H. under the tradename Alkamuls 400-DO, from Ethox Chemicals, Greenville, S.C. under the tradenames Ethox DO-9 and Ethox ML-9 and from DeForest Enterprises, Boca Raton, Fla. under the tradename DeThox Acid L-9; alkoxylated alkylphenols such as those available from The Dow Chemical Company, Midland, Mich. under the tradename Triton X-114 and from Rhodia, Cranbury, N.J. under the tradename Igepal CO-530; sulfates and sulfonates of oils and fatty acids such as those available from Georgia Pacific Corp., Chemical Division, Bedford Park, Ill. under the tradename Actrasol SRK-75; sodium petroleum sulfonates such as those available from Crompton Corp., Middlebury Conn. under the tradename Petronate HL; sulfonates of naphthalene and alkyl naphthalenes such as those available from Akzo Nobel, Chicago, Ill. under the tradename Petro BA; sucrose and glucose esters and derivatives such as those available from Degussa Corp., Parsippany, N.J. under the tradenames Tego Care P and Tego Care 450; fatty esters, ethoxylated fatty esters and glycerol esters such as those available from Alzo International, Inc., Sayreville, N.J. under the tradename Dermol DGMIS and from Degussa Corp., under the tradename Tegol Alkanol CS 20; polyethylene glycols such as those available from BASF, Mount Olive, N.J. under the tradename Pluracol E; and the like.

In an embodiment, the surfactants are selected from the group consisting of fatty acids, alkoxylated alcohols, alkoxylated fatty acids, sucrose and glucose esters and derivatives and polyethylene glycols and mixtures thereof.

In an embodiment, the surfactants are selected from the group consisting of ethoxylated alcohols, tall oil fatty acids and ethoxylated fatty acids and mixtures thereof.

In an embodiment, the composition of this invention comprises about 99 to about 60 weight percent of one or more (poly)$C_6$-$C_{12}$ alpha olefins and about 1 to about 40 weight percent of one or more surfactants.

In an embodiment, the composition comprises about 96 to about 70 weight percent of one or more (poly)$C_6$-$C_{12}$ alpha olefins and about 4 to about 30 weight percent of one or more surfactants.

In an embodiment, the composition comprises about 85 to about 75 weight percent of one or more (poly)$C_6$-$C_{12}$ alpha olefins and about 15 to about 25 weight percent of one or more surfactants.

In the UCTAD process as described above, the release aid is applied to the TAD fabric. In the CTAD process, the release aid is applied to the TAD fabric and optionally to the creping cylinder. In conventional wet press machines, the release aid is applied to the creping cylinder.

For application to the TAD fabric and/or the creping cylinder, the composition is diluted with water to prepare an aqueous composition comprising about 0.01 to about 2 percent by weight of the poly alpha olefin-surfactant composition.

Typically, about 1 $mg/m^2$ to about 40 $mg/m^2$ of the release aid described herein is applied to the TAD fabric or creping cylinder. As used herein, $mg/m^2$ refers to the amount of poly alphaolefin/surfactant mixture measured in milligrams relating to the surface area of the fabric or cylinder surface to which it is applied.

The aqueous release aid composition may be applied to the TAD fabric and creping cylinder by any means suitable for achieving uniform application of the formulation onto the fabric or cylinder, for example by spraying or flooded nip application.

In an embodiment, the aqueous release aid composition is applied to the TAD fabric by means of a sprayboom located after the fabric cleaning station but before the pick-up shoe transfer point. At the pick-up shoe transfer point, the wet tissue sheet is transferred to the TAD fabric for transport through the TAD dryers.

For application to the Yankee dryer in the CTAD process or in conventional creping processes, the release aid is sprayed onto the Yankee dryer in aqueous form prior to the point where the wet paper web contacts the dryer.

The spraying applications described above may be further improved by a variety of means, for example by using spraybooms designed for double or triple coverage, by oscillating the sprayboom and by recirculation of the diluted release aid composition from the outlet of the sprayboom to improve mixing and reduce the possibility of separation.

In an embodiment, an adhesive that is also in aqueous form is applied to the Yankee dryer along with the release aid. The release aid provides lubrication between the Yankee dryer surface and the doctor blade used to crepe the tissue paper from the Yankee dryer. The release aid also allows the tissue paper to release from the adhesive during the creping process.

One example of a suitable creping adhesive is a water-soluble, cationic polyamide-epihalohydrin (PAE) resin. The PAE resin comprises the reaction product of an epihalohydrin and a long chain polyamide containing secondary amine groups. Polyamide-epihalohydrin resins that can be used as a creping adhesive aid in conjunction with the release aid of the invention can be obtained commercially from several companies. Examples are available from Nalco Company, Naperville, Ill. under the tradenames Nalco 690HA, Nalco 675P, Nalco 663XDP, Nalco 01PX057, Nalco 74943, Nalco 03PV094 and Nalco 03PV001, from Hercules, Inc., Wilmington, Del. under the tradenames Kymene.RTM. and Crepetrol.RTM.; and from Georgia Pacific, Atlanta, Ga. under the tradename Unicrepe.RTM. These PAE resins are generally supplied as a concentrated solution in water, and are diluted for spraying onto the cylinder of a Yankee dryer or onto a semi-dry tissue web.

Additional creping adhesives known in the art include polyvinyl alcohol, ethylene/vinyl acetate copolymer, animal glue and polyvinyl acetate.

U.S. Pat. No. 4,528,316 discloses a creping adhesive aid comprising an aqueous admixture of polyvinyl alcohol and a water-soluble, thermosetting, cationic polyamide resin which provides increased adhesion in the manufacture of creped wadding U.S. Pat. No. 5,338,807 discloses a creping adhesive aid comprising the reaction product of a polyamide of a dibasic acid or of the ester of an aliphatic dibasic acid and methyl bis(3-aminopropylamine) with epichlorohydrin in a mole ratio of the polyamide to the epichlorohydrin between about 1:0.1 and about 1:0.33.

U.S. Pat. No. 5,382,323 discloses a halogen-free adhesive obtained by reacting adipic acid with diethylenetriamine at equimolar ratios of from 1.2:1.0 to 1.0:1.2 and then crosslinking with a dialdehyde selected from gluteraldehyde, glyoxal, or mixtures thereof. Improved adhesion and peel strength are obtained.

U.S. Pat. No. 5,944,954 discloses a creping adhesive comprising cationic starch and optionally a polyvinyl alcohol and a water-soluble thermosetting cationic polyamide-epihalohydrin resin which provides high adhesion and doctorability for dry creping.

Other examples of creping adhesive compositions are disclosed in U.S. Pat. Nos. 5,187,219; 5,246,544; and 5,338,807; and in Canadian Patent No. 979,579.

The basic chemistry in the preparation of this water-soluble cationic polyamide-epihalohydrin (PAE) resin is described in U.S. Pat. Nos. 2,926,116; 2,926,154; 3,058,873; and 3,772,076. These PAE resins may be used as wet-strength resins, i.e. resins added to the paper slurry at the wet end of the paper machine to impart a desired degree of strength to the manufactured paper when wet, but can also be used as a creping adhesive which is sprayed onto the cylinder of a Yankee dryer prior to the point where the paper web contacts the dryer.

An additional example of a creping adhesive which may be used in conjunction with the release aid of the invention is a polyalkylene polyamine/epihalohydrin resin described for example in U.S. Pat. Nos. 2,595,935; 3,248,353 and 3,655,506. These PAE resins are made from a polyalkylene polyamine having at least one secondary amine group and a saturated aliphatic dicarboxylic acid or dicarboxylic acid derivative. Preparation of polyamidoamine/epihalohydrin resins is described, for example, in the aforesaid U.S. Pat. No. 5,338,807 and Canada 979,579. These polyamine/epihalohydrin resins are typically water-soluble and crosslinkable.

The release aid compositions of this invention may also be used in combination with functional additives used in the art to improve the softness of the tissue or towel. Representative functional additives include organic quaternary salts having fatty chains of about 12 to about 22 carbon atoms including dialkyl imidazolinium quaternary salts, dialkyl diamidoamine quaternary salts, monoalkyl trimethylammonium quaternary salts, dialkyl dimethylammonium quaternary salts, trialkyl monomethylammonium quaternary salts, ethoxylated quaternary salts, dialkyl and trialkyl ester quaternary salts, and the like. Additional suitable functional additives include polysiloxanes, quaternary silicones, organoreactive polysiloxanes, amino-functional polydimethylsiloxanes, and the like.

In an embodiment, the functional additives are formulated with the release aids of this invention for application to the fabric and/or creping cylinder.

In an embodiment, the functional additives are selected from dialkylimidazolinium quaternary salts and quaternary silicones.

The foregoing may be better understood by reference to the following examples, which are presented for purposes of illustration and are not intended to limit the scope of the invention.

EXAMPLE 1

A product formulation containing a representative (poly) alpha olefin is compared to a similar commercial product (Nalco 64575, Nalco Company, Naperville, Ill.) containing a mineral oil in a plant trial. Both products contain the same level and types of surfactants, which serve to emulsify the product when it is applied with water. Nalco 64575 is already known for providing superior release properties compared to other commercial offerings in the marketplace.

The trial takes place on a CTAD machine in which a three-layer headbox delivers the furnish to a twin wire forming section. The formed sheet is transferred to the TAD fabric by means of a vacuum pick-up shoe. Two vacuum molding boxes pull the sheet into the fabric. The sheet is dried to a consistency of 70-80% by means of multiple TAD dryers in series. The sheet is transferred to the Yankee dryer using a solid pressure roll. The fabric release products are sprayed onto the side of the TAD fabric that will be contacting the sheet, prior to the vacuum pick-up shoe.

For Nalco 64575 an application rate of 30 mg/M$^2$ of TAD fabric surface provides good release of the sheet from the TAD fabric, good cleanliness of the fabric and good machine runnability. A product formulation containing PAO applied at a level of 8 mg/m$^2$ provides similar or improved operation. A reduction in product usage of 73% is realized. Good transfer of the sheet from the TAD fabric is observed and fabric cleanliness is maintained. Somewhat higher add-on levels to 12 mg/M$^2$ provide even better cleanliness of the fabric and associated rolls, including the pressure roll, and molding boxes. These benefits can be used to provide improved TAD fabric life since the high pressure cleaning showers can be run at reduced pressures. Additionally a reduction in the use of roll and doctor lube showers is observed. With less showering, less water is applied to the TAD fabric and ultimately this can result in the ability to lower the TAD temperature resulting in energy savings.

EXAMPLE 2

The release provided by the formulations of this invention is measured by means of a wet tack peel adhesion test. This test measures the force required to peel a cotton strip from a heated metal panel. First an adhesive film containing the release aid of interest is applied to the metal panel by means of a #40 coating rod. For these experiments, the adhesive is a commercial product, Nalco 690HA, Nalco Company, Naperville, Ill. The adhesive is applied to the panel at 15% solids. Mixed with the adhesive are various concentrations of the release formulations in the range from about 0 to about 2 percent. The metal panel is heated to 100° C. and at this point a wet cotton strip is pressed into the film by means of a 1.9 kg cylindrical roller. After the strip is applied, the metal panel is placed in a 105° C. oven for 15 minutes to dry the strip. The metal plate is then clamped in a tensile testing apparatus. One end of the cotton cloth is clamped in the pneumatic grip of the tester and the cloth is peeled from the panel at an angle of 180° and at a constant speed. During the peeling the metal plate is controlled to a temperature of 100° C. The results are shown in Table 1.

In Table 1, Nalco 64575 is a commercial product containing mineral oil and surfactant emulsifiers. Formulation A contains a representative (poly) alpha olefin derived from decene having a viscosity of 45-49 cSt., available from BP, Chicago, Ill. instead of the mineral oil in 64575. Formulation B contains a representative (poly) alpha olefin derived from dodecene having a viscosity of 40-48 cSt., available from BP, Chicago, Ill. Formulation C contains a representative (poly) alpha olefin derived from decene having a viscosity of 62-69 cSt., available from BP, Chicago, Ill. Formulation D contains a representative (poly) alpha olefin having a viscosity of 4549 cSt., available from Cognis, Cincinnati, Ohio. All formulations contain the same surfactant emulsifiers and the same weight % of oil. The release formulations are mixed with the adhesive (690 HA) at levels of 1 and 2%. As shown in Table 1, formulations containing synthetic oil provide improved release compared to the commercial product containing mineral oil.

TABLE 1

| Type of Release Used | % Release | Average Reduction In Peel Force (%) |
|---|---|---|
| None | 0 | 0 |
| 64575 | 1.0 | 33.6 |
|  | 2.0 | 34.6 |
| Formulation A | 1.0 | 42.0 |
|  | 2.0 | 46.9 |
| Formulation B | 1.0 | 47.0 |
|  | 2.0 | 42.2 |
| Formulation C | 1.0 | 34.7 |
|  | 2.0 | 61.0 |
| Formulation D | 1.0 | 41.0 |
|  | 2.0 | 58.4 |

Changes can be made in the composition, operation, and arrangement of the method of the invention described herein without departing from the concept and scope of the invention as defined in the claims.

The invention claimed is:

1. A composition comprising one or more (poly)$C_6$-$C_{12}$ alpha olefins and one or more surfactants and at least one functional additive, the functional additive capable of improving the softness of paper made from a paper web containing the functional additive, the functional additive comprising quaternary silicones, and wherein the (poly)$C_6$-$C_{12}$ alpha olefins comprise between 99 and 60 weight percent of the composition.

2. The composition, of claim 1 wherein the (poly)$C_6$-$C_{12}$ alpha olefins have a viscosity of about 5 to about 400 cSt at 40° C.

3. The composition of claim 2 wherein the composition comprises one or more (poly)$C_6$-$C_{12}$ alpha olefins.

4. The composition of claim 1 wherein the surfactants are selected from the group consisting of fatty acids, alkoxylated alcohols, alkoxylated fatty acids, sucrose and glucose esters and derivatives and polyethylene glycols and mixtures thereof.

5. The composition of claim 4 wherein the (poly)$C_6$-$C_{12}$ alpha olefins are prepared from decene, dodecene, or a mixture thereof.

6. The composition of claim 5 wherein the (poly)$C_6$-$C_{12}$ alpha olefins have a viscosity of about 30 to about 70 cSt at 40° C.

7. The composition of claim 6 comprising about 96 to about 70 weight percent of one or more (poly)$C_6$-$C_{12}$ alpha olefins.

8. The composition of claim 6 comprising about 85 to about 75 weight percent of one or more (poly)$C_6$-$C_{12}$ alpha olefins.

9. The composition of claim 8 wherein the surfactants are selected from the group consisting of ethoxylated alcohols, tall oil fatty acids and ethoxylated fatty acids and mixtures thereof.

10. The composition of claim 1 wherein the surfactants comprise between 1 and 40 weight percent of the composition.

11. The Compomsition of claim 10 wherein the functional additive includes dialkylimidazolinium quaternary salts.

12. The composition of claim 1 in which the composition is diluted within an aqueous composition to a dilution of about 0.01 to about 2 percent by weight.

13. The composition of claim 12 wherein the aqueous composition further comprises one or more softness improving functional additives.

* * * * *